July 30, 1929.  G. ROSSETTI  1,722,541
NUT LOCK
Filed Nov. 26, 1927
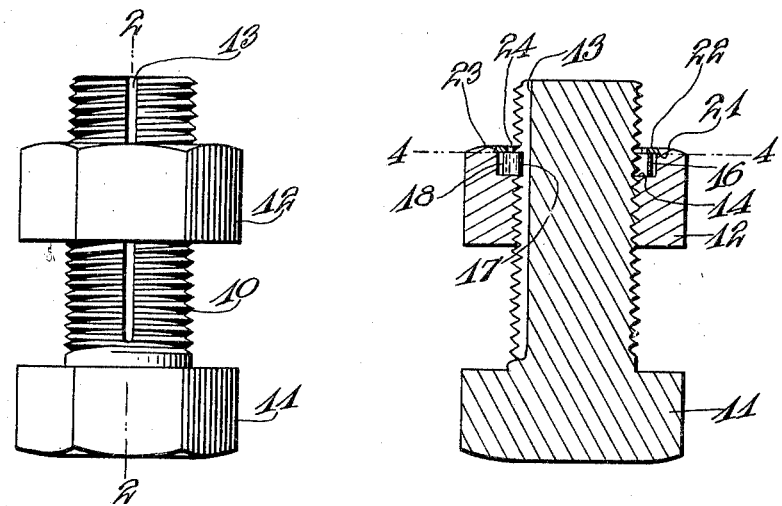
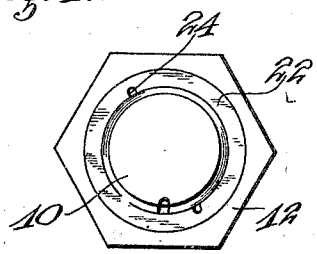
Fig. 1.
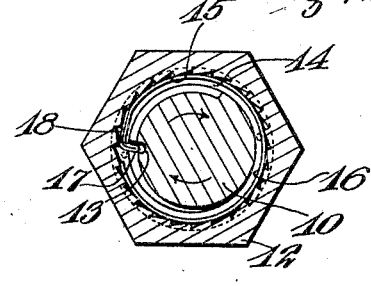
Fig. 2.
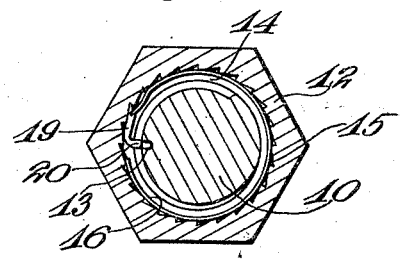
Fig. 3.
Fig. 5.
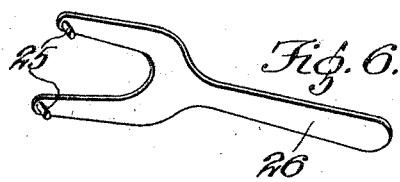
Fig. 4.
Fig. 6.
George Rossetti
INVENTOR.
BY Milo B Stevens Co
ATTORNEYS.

Patented July 30, 1929.

1,722,541

UNITED STATES PATENT OFFICE.

GEORGE ROSSETTI, OF CHICAGO, ILLINOIS.

NUT LOCK.

Application filed November 26, 1927. Serial No. 235,892.

This invention relates to devices for locking a nut on the shank of a bolt, and more particularly to such devices as apply to a longitudinally-grooved bolt, and it is my main object to provide a device of this kind which is efficient.

A further object of the invention is to provide a novel nut lock which interposes but a single working part between the nut and the bolt.

Another object of the invention is to make a novel nut lock of a compact structure and having no external parts which are apt to jar loose or get out of order.

A final, but nevertheless important object of the invention is to construct the novel nut lock on lines of exceeding simplicity, in order that it may be manufactured at a minimum of expense and handled with ease.

With the above objects in view and any others that may suggest themselves from the specification and claims to follow, a better understanding of the invention may be gained by reference to the accompanying drawing, in which—

Figure 1 is an elevation of a nut and bolt assembly on the line of my invention;

Fig. 2 is a section on the line 2—2 of Figure 1;

Fig. 3 is a plan view;

Fig. 4 is a section on the line 4—4 of Figure 2;

Fig. 5 is a view similar to Figure 4, showing a modification; and

Fig. 6 is a perspective view, on a smaller scale, of a tool which may be applied to unlock the nut.

While many devices for the locking of a nut on a bolt have been devised in past years, few have been found to approach a suitable degree of efficiency, most being complicated, delicate, or too costly. In attaining the objects above contemplated, I have had in view to remove the deficiencies prevalent in devices of the prior art, and produce an appliance which may be considered reliable and practical.

Referring specifically to the drawing, 10 denotes the shank, and 11 the head of typical bolt; and 12 represents a nut suitable therefor. On general lines, I do not materially alter the nut or bolt, so that it need not be said that the same will be weakened or radically changed for my purpose. As in the case of nut locks of a similar nature, I groove the threaded shank 10 of the bolt longitudinally, as indicated at 13, this being the only change in the bolt.

As to the nut, I leave the larger portion thereof in normal form, but cut down into the outer end thereof with a relatively shallow circular recess 14, the same being made about the site of the bolt. The floor of the recess is plain, but the walls thereof are cut with a ratchet formation in relief, so as to present a circular series of stepped undercut notches 15. Within the recess is laid a circular leaf-spring 16, the same having a tendency to expand against the ratchet formation of the wall. One end of the spring is plain, while the other is doubled, as indicated at 17, given a fairly sharp inward bend and formed with a terminal spur 18. The double portion of the spring is adapted to seat in the groove 13 of the bolt, and the expansive tendency of the spring will cause the spur 18 to seat in one of the undercut notches 15 of the wall. The notches are cut in a direction to slip on the spur when the nut is threaded onto the bolt shank, but to lock against the same if an attempt is made to unthread the nut. It will thus be seen, that the doubled portion 17 of the spring being anchored to the bolt, any unthreading or reversing effort expended upon the nut will be checked. Also, the intimate or joint formation of the doubled portion with the spur, lends the latter sufficient strength and a firm backing to withstand unthreading tendencies on the part of the nut. In practice, this feature constitutes a lock for the nut, so that vibration or rough handling of the parts secured by the bolt and the nut will not induce the loosening or unthreading of the nut.

In assemblies of larger size than may be considered ordinary, it is well not to depend upon the spring for both the expansive action and the function of the spur. Thus, the modification in Figure 5 shows the spur represented by a dog 19, with which the bolt-anchoring element 20 is integral. The spring is fitted to the dog in a manner to bear outwardly upon the same and assure its seating in the ratchet notches as the nut is turned.

Some nut locks of the prior are require parts to be destroyed or disabled in order that the nut may be loosened or unthreaded at will, but my invention allows for a simple method of securing this result without damage to any part, enabling the assembly to be used over indefinitely. Thus, I slightly enlarge the mouth of the recess 14 to form a very shallow but larger recess 21, which I close by a thin metal ring 22. The recess is preferably undercut very slightly, as indicated at 23, to enable the ring to be fitted with a locking snap, in the manner of a watch case lid, since it is not intended ordinarily that the ring be removed. The ring fills the space between the bolt shank and the outer face of the nut, providing a neat and compact facing for the nut. Also, the ring forms a closure for the recess 14, so that dirt or foreign matter may not enter readily, or tampering done; also, the closure formed by the ring prevents the dislodgment or possible loss of the spring 16. For the unlocking process, I perforate the ring at diametrically opposite points, as indicated at 24, to permit the insertion of a pair of studs 25 on the prongs of a forked tool 26, which I have shown on a reduced scale in Figure 6. The perforations 24 are in the inner edge of the ring 22, so that when the tool 26 is applied the prongs 25 will descend well inside of the position occupied by the spring 16. The tool may now be used to turn the ring to a point where the studs 25 will assume the position indicated by dotted lines in Figure 2. It will be seen that the left-hand stud 25 is now behind the bend in the doubled portion 17 of the spring. As the tool 26 is now turned whereby to turn the ring 22 further in the direction of the arrows in Figure 4, the left-hand stud 25 will impinge upon the bend in the spring whereby to advance the doubled portion 17 further into the groove 13 of the bolt, thereby retracting the spur 18 from the particular notch 15 in which it is seated. As the spur 18 now clears the nut, a regular wrench may be applied to the same while the tool 26 is held still to unthread the nut from the bolt shank. The tool may be used with the same effect on the modified structure of Figure 5.

It will be seen that I have provided a structure of a minimum of parts to secure the objects contemplated by my invention. The small groove cut in the bolt and the relatively shallow recess of the nut will not weaken these parts in any manner; yet these alterations furnish means for the disposal of the spring 16 and its locking extension 18. The spring may be designed to have sufficient tension to maintain the nut in locked position against hard usage or excessive vibration of the parts, and I am firmly of the opinion that once my nut and bolt assembly have been locked in the manner described they may be depended upon to stay locked for an indefinite period. As to the tool 26, I have shown the same as a quick and handy means for unlocking the nut, but it may be readily seen that in case such a tool is not handily found when wanted, any nail or pin of suitable size may be applied in the manner of the active stud 25 to compress the locked portion of the spring sufficiently to clear the notched wall of the nut. In the case of the tool, while but one of the studs 25 is the active one, I have provided the other for purposes of balance, so that a true rotary motion may be had by the tool when it is applied in both of the perforations 24, rather than a possibly erratic or uneven motion, in case but one stud 25 and perforation 24 were used. Also, the provision of two studs and perforations expedites the finding of the working area by one or the other of the studs as the ring 22 is turned.

In conclusion, it will be seen that I have provided a product of simplicity and apparent efficiency. However, I do not wish to limit myself to the exact structure shown but rather desire to include all such changes or refinements as may improve the structure without departing from the spirit and scope of the invention as outlined in the appended claims.

I claim:

1. The combination with a longitudinally-grooved bolt shank; of a nut lock comprising a nut with an interrupted annular surface, a tension member between the bolt shank and said surface, and a spur carried by the tension member to engage said surface, the spur having an immediate heel extension anchored in the groove of the bolt shank.

2. The combination with a longitudinally-grooved bolt shank; of a nut lock comprising a nut with an end-cavity containing an interrupted annular surface, a tension member anchored in the groove of the bolt, a spur directed by the tension member to engage said surface, said spur having a heel portion partly extended into the groove of the bolt shank, and a plate to close said end-cavity, said plate being perforated for the insertion of a tool to retract the spur from said surface and further extend the heel of the spur into the groove of the bolt shank.

3. The combination with a longitudinally-grooved bolt shank; of a nut lock comprising a nut with an interrupted annular surface about the bolt shank, and a spring curved about the latter and expansive in the direction of said surface, one end portion of the spring having a spur in engagement with said surface and a heel seating in the groove of the bolt shank.

4. The combination with a longitudinally-grooved bolt shank; of a nut lock comprising a nut with an annular surface with a ratchet formation about the bolt shank, and a spring curved about the latter and expansive in the direction of said surface, said spring having one end bearing against said surface and the other first bent inwardly to become anchored in the groove of the bolt shank and then bent outwardly to present a spur into cooperative engagement with said surface in the manner of a pawl.

5. The combination with a longitudinally-grooved bolt shank; of a nut lock comprising a nut with an end cavity containing an annular surface with a ratchet formation about the bolt shank, a spring curved about the latter and expansive in the direction of said surface and carrying a spur to cooperate with the same in the nature of a pawl, and a closure ring rotatably fitted in the mouth of said cavity, said ring being perforated for the insertion of tools to turn the ring and become wedged between the said surface and the spur, whereby to retract the latter from said surface.

In testimony whereof I affix my signature.

GEORGE ROSSETTI.